(12) United States Patent
Cok et al.

(10) Patent No.: US 7,667,891 B2
(45) Date of Patent: Feb. 23, 2010

(54) DESKTOP DISPLAY WITH CONTINUOUS CURVED SURFACE

(75) Inventors: Ronald S. Cok, Rochester, NY (US); Michael E. Miller, Honeoye Falls, NY (US); Michael J. Murdoch, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 534 days.

(21) Appl. No.: 11/268,998

(22) Filed: Nov. 8, 2005

(65) Prior Publication Data

US 2007/0103776 A1 May 10, 2007

(51) Int. Cl.
G03B 21/56 (2006.01)
G09G 3/32 (2006.01)

(52) U.S. Cl. .................. 359/443; 359/451; 362/249.02; 345/82

(58) Field of Classification Search ................. 359/451; 362/335, 361, 249.01, 249.02; 345/82, 76; 40/542, 544, 446
See application file for complete search history.

(56) References Cited

U.S. PATENT DOCUMENTS

| | | | |
|---|---|---|---|
| 3,514,871 A | 6/1970 | Tucker | |
| 3,784,742 A * | 1/1974 | Burnham et al. | 348/123 |
| 4,740,779 A | 4/1988 | Cleary et al. | |
| 5,275,565 A | 1/1994 | Moncrief | |
| 6,228,228 B1 * | 5/2001 | Singh et al. | 204/192.1 |
| 6,247,815 B1 * | 6/2001 | Inova | 353/30 |
| 6,304,703 B1 * | 10/2001 | Lowry | 385/120 |
| 6,332,690 B1 | 12/2001 | Murofushi | |
| 6,573,579 B1 * | 6/2003 | Ho et al. | 257/431 |
| 6,813,074 B2 | 11/2004 | Starkweather | |
| 6,871,958 B2 * | 3/2005 | Streid et al. | 353/37 |
| 7,121,667 B2 * | 10/2006 | Moriwaki et al. | 353/30 |
| 2003/0223113 A1 | 12/2003 | Starkweather | |
| 2004/0108806 A1 * | 6/2004 | Cok et al. | 313/504 |
| 2004/0135160 A1 * | 7/2004 | Cok | 257/88 |
| 2004/0239890 A1 | 12/2004 | Starkweather | |
| 2005/0201080 A1 * | 9/2005 | Seward | 362/97 |
| 2007/0002130 A1 * | 1/2007 | Hartkop | 348/14.16 |

* cited by examiner

Primary Examiner—Christopher Mahoney
(74) Attorney, Agent, or Firm—Nelson Adrian Blish

(57) ABSTRACT

A curved display device comprising a continuous, curved, concave viewing surface having a surface width W greater than or equal to 48 cm and less than or equal to 200 cm, and wherein a distance D from the center of a straight line segment which connects the centers of the display edges in the width dimension, to the center of the display surface in the horizontal dimension is less than or equal to ((0.215W)−6.5).

15 Claims, 3 Drawing Sheets

DESKTOP DISPLAY WITH CONTINUOUS CURVED SURFACE

FIELD OF THE INVENTION

The present invention relates to desktop display devices and, more particularly, to displays having a curved viewing surface.

BACKGROUND OF THE INVENTION

Flat-panel display devices, such as liquid-crystal, plasma, and OLED displays are becoming increasingly large. While it is well known that increasing the size of the display generally benefits the user by allowing him or her to view more information simultaneously and to reduce the amount of input device movement necessary to swap screens in and out of focus, the use of large flat desktop display monitors also have significant disadvantages.

One of the most significant disadvantages of a large, flat desktop display can be illustrated by considering the scenario that occurs when the user positions his or her head to a viewing distance that allows him or her to comfortably view information in the center of the display screen. For a small display, information at the edges of the display is at approximately the same viewing distance as the information at the center of the display. However, as the horizontal dimension of the display is increased significantly, the viewing distance to the edges of the display increases significantly if the user maintains their original head position. This can make it difficult for the user to see the information at the edges of the large desktop display without making strenuous whole-body movements that are required to bring their eyes closer to the edge of the display. One way to overcome this problem is to utilize a display that is not flat.

Curved displays have been discussed both for group and individual viewing. However, the design constraints for such systems differ significantly since the shape of the surface may be optimized for an individual's performance when designing displays, such as desktop monitors, while many users must be able to comfortably view displays used for group viewing in applications such as a cinematic or data presentation. Further, since large displays designed for group viewing are typically several meters or more in width, they are typically viewed at a viewing distance of several meters while desktop monitors designed for use by an individual are usually 2 meters or less in width and are viewed from a viewing distance of a few decimeters. Since the viewing distance to displays for group viewing is significantly larger than the viewing distance to displays intended for use by a single individual, the users of displays for group viewing will be less sensitive to changes in the radius of curvature of these large displays than a user of a smaller display that is designed to be used by an individual within a typical computerized desktop working environment.

The need for large, non-flat displays that are designed for use by a single user has been recognized within the field of aircraft simulation for several decades. For example, U.S. Pat No. 3,514,871 entitled "Wide angle visual display" discusses a flight simulation system utilizing three individual display modules that are configured to produce a single display system, wherein the center display module is oriented perpendicular to the user's forward line of sight and the two neighboring display modules are angled such that the ends of the neighboring display modules furthest from the center of the center display module are closer to the user than they would have been had the display modules all been placed on a plane perpendicular to the user's line of sight. While this disclosure does not explicitly discuss the angles of these display modules to one another, other than to state that they are "circumferentially spaced" about the user to provide greater clarity and detail, the Figures within this disclosure show the centers of the display modules as all being equally spaced from the user. Note that by placing the center of the display modules at equal distances from the user, the viewing distance is approximately equal at each point on the final display surface.

Displays that provide equal viewing distance at every point are also described by U.S. Pat. No. 5,275,565, entitled "Modular display simulator and method," which discusses the use of multiple display modules to compose a display. This patent further discloses display modules being oriented such that the resulting display at the center of each of the display modules is perpendicular to the user's line of sight as he or she turns his or head to look at them and shows display modules that are each positioned to be viewed from an equal viewing distance.

Display surfaces for a single user wherein every point on the display surface is equally distant from the user's eyes is also discussed in U.S. Pat. No. 4,740,779 entitled "Aircraft Panoramic Display". Within this disclosure it is stated that the ideal means for generating information for such a display includes the "means for determining the position of a great circle on a sphere having its center at the position of a great circle on a sphere having its center at the eye point", which indicates that a display formed from a portion of a spherical surface would ideally have a radius of curvature equal to the user's preferred viewing distance. This physical arrangement is clearly demonstrated within FIG. 5 of U.S. Pat. No. 4,740,779. This patent further states that when multiple displays are provided the display screens are positioned such that "a line normal to a portion of each display screen passes approximately through the eye point", further indicating equal viewing distance to various points on the display surface.

For a given viewing distance, as the curvature of the display surface is increased from a flat to a cylindrical surface having a radius of curvature equal to the user's viewing distance, the horizontal field of view of the display (i.e., the subtended angle of the display on the human's retina) increases. This is important since it is known that as the field of view of the display is increased, the user will have an increased sense of immersion when using the display. That is, a user will feel more like they are "in the display" rather than just looking at the display when the display field of view is large. This increased sense of immersion has been shown to improve user performance and enjoyment within applications where it is important that the display provide the perception of working within a virtual reality. Therefore, it is well established in the prior art that a large field of view, curved personal display would ideally have a radius of curvature near or equal to the user's viewing distance.

While the use of curved displays for simulation, virtual reality, and group presentation venues has been addressed extensively within the patent literature, the use of curved displays for desktop office use has been addressed to a much lesser extent. Ergonomic visual display terminal (VDT) desktop standard ISO 9241-5 entitled "Ergonomic requirements for office work with visual display terminals (VDTs)" states that the optimum viewing distance for office work in the seated position is 600 mm. Based upon the simulation and virtual reality display prior art, one should accordingly expect the ideal radius of curvature for a cylindrically shaped display intended for desktop use to be 60 cm.

U.S. Pat. No. 6,813,074, US20030223113, and US20040239890 A1 all entitled "Curved screen immersive rear projection display" describe an immersive rear-projection display for use as a desktop monitor that is capable of providing aspect ratios of 2.66:1 or 4:1, or even greater on a curved display surface. As stated by the author, this display design allows viewers to be "immersed" in the images being displayed because the images can encompass both the direct and the peripheral views of a user. In one implementation, the immersive rear-projection display includes two or more electronic projectors (e.g., three) that are positioned behind a curved translucent display screen. The electronic projectors project respective display images adjacent each other onto the display screen. In one implementation, the curved display screen is formed as a generally continuous curve with substantially no discontinuities in the curvature. Also, the curved display screen may be formed with a generally consistent radius of curvature (i.e., generally as a circular or cylindrical segment), or without a generally consistent radius of curvature, such that the shape of the curve "reduces or eliminates perspective distortion that can otherwise occur at the edges of a flat screen." The complete elimination of perspective distortion typically will require a constant viewing distance to each point on the display surface. This disclosure, however, also includes an example of a display having a radius of curvature of about 86 cm (34 inches) with a height of 30 cm (12 inches) and a length of 120 cm (48 inches). This example would require a relatively large viewing distance (86 cm) to eliminate perspective distortion. While it may be possible to utilize projection displays within a desktop environment, such a solution is not desirable simply because of the volume of desktop space these displays will consume. Further, the disclosed projection display embodiment may not optimize the degree of curvature for viewer preferences in desktop environments.

Curved flat panel displays are also known in the prior art. For example, U.S. Pat. No. 6,332,690, discloses a liquid crystal display with a curved screen. The display surface of the screen is disclosed as possibly being curved forwards, as well as rearwards, to be a wholly or partially quadratic or higher-degree surface, such as a cylindrical surface about a vertical, oblique or horizontal axis, a parabolic or hyperbolic surface, or a spherical surface, alone or in combination. Note that besides providing a thin display, the use of flat panel technology also increases the flexibility to select different shapes and degrees of curvature over what is possible using projection technology since the shape of a projected image is limited to shapes that can be formed using projection optics. The use of projection optics often imposes limits on the degrees of curvatures that can be obtained as well as the overall shape of the display surface as it is difficult, if not impossible, to produce display surfaces having an instantaneous change in curvature using a projection lens without introducing artifacts. However, as long as curved flat panel devices can be formed, they may take on practically any degree of curvature or shape. Despite the fact that U.S. Pat. No. 6,332,690 acknowledges the flexibility to select from among a large range of display shapes and curvatures, this disclosure does not specifically discuss the preferred shape of such a display for a desktop environment.

Applicants have determined, however, that the prior-art cylindrical or spherical display surfaces having a constant viewing distance across the horizontal dimension are not optimized for comfortable and efficient use as desktop displays in computer information applications. There is a need, therefore, for curved flat panel desktop display devices having display surfaces that provide a more desirable tradeoff between a display surface that is always at a single viewing distance, as is the case for desktop displays having a circular shape along their horizontal dimension with a radius of curvature equal to the design viewing distance of the display device, and a display surface that is flat.

SUMMARY OF THE INVENTION

In accordance with one embodiment, the present invention is directed towards a curved display device comprising a continuous, curved, concave viewing surface having a surface width W greater than or equal to 48 cm and less than or equal to 200 cm, and wherein a distance D from the center of a straight line segment which connects the centers of the display edges in the width dimension, to the center of the display surface in the horizontal dimension is less than or equal to $((0.215\,W)-6.5)$.

ADVANTAGES

The present invention has the advantage that it can provide a curved display for use in desktop applications that is comfortable and efficient for users.

DETAILED DESCRIPTION OF THE INVENTION

Figure 1:
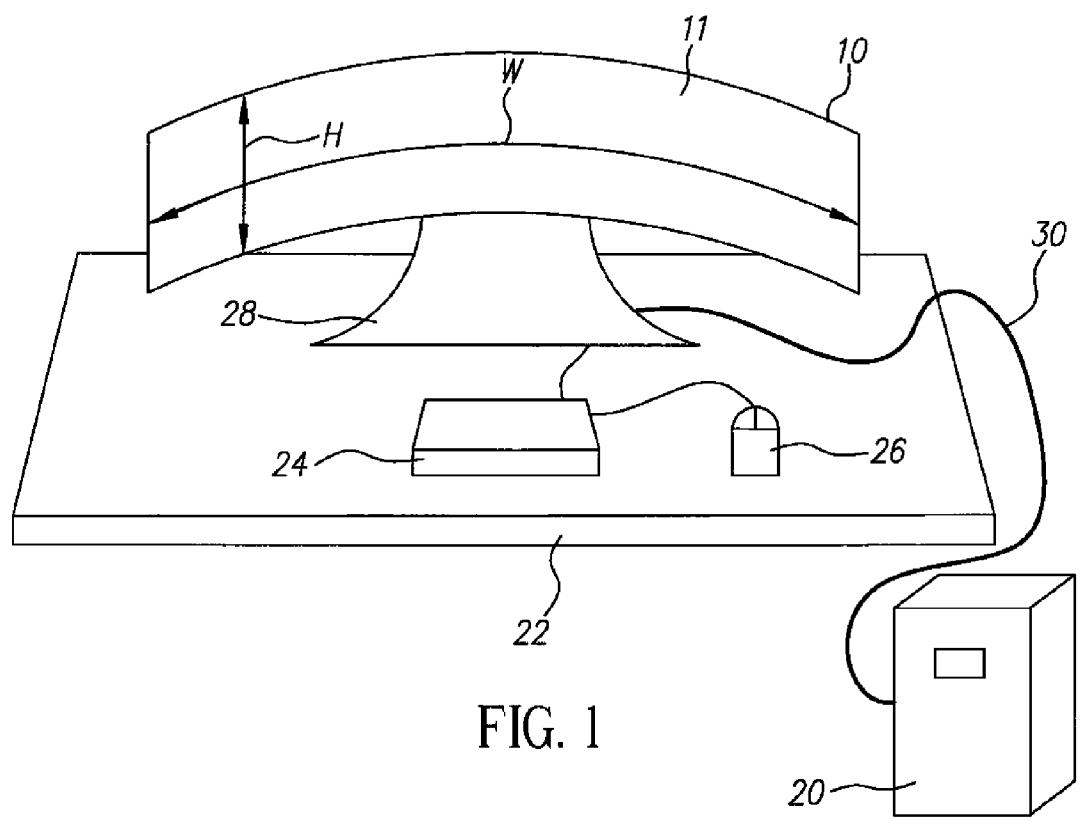
FIG. 1 is a system employing a wide-format display of the present invention.
Figure 2:
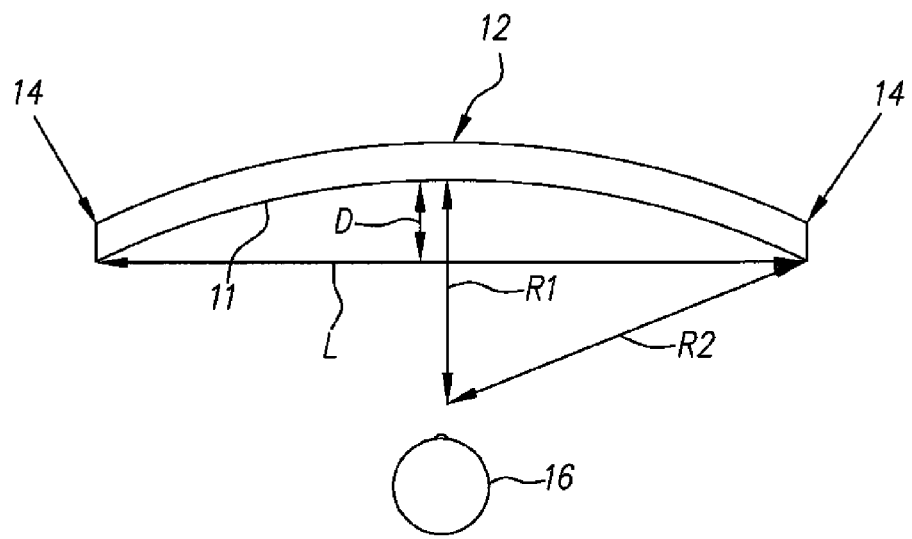
FIG. 2 is top-view illustration of an embodiment of the present invention.

Referring to FIG. 1, a display device 10 is illustrated having a continuous, curved, concave viewing surface 11 with a surface width of W. In accordance with the invention, W is greater than or equal to 48 cm and less than or equal to 200 cm, as the invention is directed toward unique preferred curve parameter selection criteria established by applicants for displays in such size range intended for desktop applications. As illustrated in FIG. 2, viewing surface 11 of the display emits, transmits or reflects light to be viewed by a user 16. A straight line segment L connects the centers of the display edges 14 in the width dimension. This line is bisected at a point that is half way between the centers of the display edges 14. The curvature of this display surface is parameterized by the distance D from the center of the straight line segment L to the center 12 of the display in the width dimension. Throughout the remainder of this disclosure the distance D will be referred to as the "end deflection" of the viewing surface 11. In accordance with invention, D is less than or equal to $((0.215\,W)-6.5)$. Preferably, D is also at least 1 cm, and more preferably D is also equal to or greater than $((0.215\,W)-14.5)$. In a particularly preferred embodiment of the present invention, D is within plus or minus 10% of $(0.215\,W-8.9)$.

Such a curved display device 10 may be employed in a computer system as shown in FIG. 1. The curved display device 10 may be controlled by a computer 20 through connection 30. A keyboard 24 and pointing device (for example, a mouse) 26 for interacting with the computer 20 may be provided. The curved display device 10 may be mounted on a support 28 and located on a surface 22, such as a desktop. The curved display 10 may be employed as a computer monitor in a desktop workstation as shown, or integrated into a variety of working environments, for example mobile equipment such as airplanes. A user 16 is typically located in front of the center of the curved display and interacts with information presented on the curve display device 10 by the computer 20 through the keyboard 24 and pointing device 26. The curved display is concave as seen by the user 16 and the horizontal display edges 14 curve horizontally toward the user 16, and pixels of the display are located on the inside of the curve.

Figure 3:
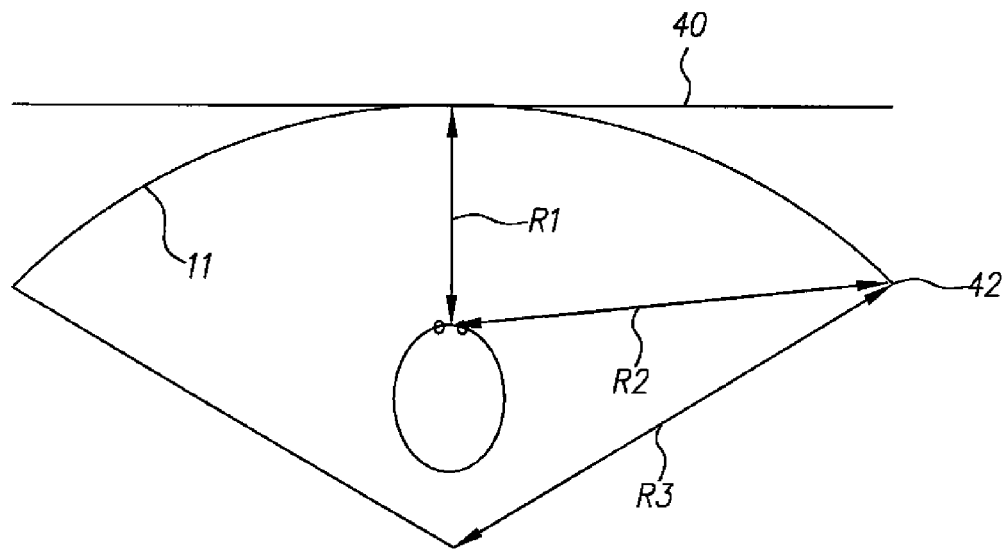
FIG. 3 is top-view illustration of an alternative embodiment of the present invention.

An important attribute of the display device is shown in FIG. 3. As shown in FIG. 3, the viewing distance R1 to the center 12 of the display surface 11 will be smaller than the viewing distance R2 to the display edges 14 of the display surface 11, providing a curved display in which information presented at the edge of the display device is viewed from a farther viewing distance than information presented at the center of the display device. However, since the display is curved, the information presented at the edge of the display will be viewed from a closer viewing distance than information presented on the edges of a flat display having the same viewing surface width W.

The curved viewing surface itself may take a variety of shapes. These shapes may include shapes having a constant radius of curvature, a radius of curvature that increases monotonically, or a radius of curvature that decreases monotonically. The first and second derivatives of the curvature over the viewing surface may also be continuous. Geometrically speaking, a curve may be defined parametrically as a function of arc length, s. For example, $\alpha$: I=(a,b)$\rightarrow$R$^3$ is a map from an interval (a,b) on a one-dimensional line to a set of ordered triples (x,y,z) in three-dimensional space. The first derivative of $\alpha$, $\alpha'(s)$, is the tangent vector of the curve at s, indicating the instantaneous direction of $\alpha$ at s. Similarly, the norm of the second derivative of $\alpha$, $|\alpha''(s)|$, is the instantaneous curvature of $\alpha$ at s. Further, the inverse of the curvature is the radius of curvature. In some embodiments described herein, the curve $\alpha$: I=(a,b)$\rightarrow$R$^3$ describes the shape of the top edge of the wide-screen display, as viewed from the top. In some embodiments, the curve $\alpha$: I=(a,b)$\rightarrow$R$^2$ is a plane curve, meaning it has no torsion and lies completely within an implied planar surface, perpendicular to the display viewing surface. Typically, though not necessarily, the top and bottom edges of the display viewing surface are similar plane curves lying in parallel planes perpendicular to the display viewing surface. It is convenient to describe the viewing surface of the wide-screen display through a combination of curves, notably a horizontal central line of latitude and a vertical central meridian. Herein, the term horizontal radius of curvature refers to the radius of curvature of a curve describing the central line of latitude, or equator, of the display surface. Similarly, the term vertical radius of curvature refers to the radius of curvature of a curve describing the central meridian of the display surface.

In accordance with one embodiment of the present invention, the viewing surface 11 of the curved display device 10 has a horizontal radius of curvature that increases from a minimum at the center to a maximum at either side. Applicants have determined that this arrangement may be preferred for workstation activities that require conventional interaction with information. Alternatively, the viewing surface 11 of the curved display device 10 may have a horizontal radius of curvature that is constant or that decreases from a maximum at the center to a minimum at either side. In some further embodiments, the radius of curvature may be constant over a portion or portions of the surface, for example either infinite (i.e., approaching flat) or a fixed value (i.e., a portion of the surface may be a circular arc), and varying over other portions. It may also be preferred to have a radius of curvature that increases continuously and that has a first and/or second derivative that are continuous. Alternatively, the first derivative of the radius of curvature may be discontinuous, e.g., a central portion of the display having a circular horizontal cross section may have flat outer edge portions oriented tangentially thereto.

As described above, a wide variety of curves may satisfy the requirements of the present invention. In fact, data collected by the authors has indicated that potential users of such a display are quite diverse in their selection of the most preferred shape with some clearly preferring a hyperbolic shape to a parabolic shape and others having exactly the opposing opinion. However, as illustrated in FIG. 3, showing a top view of a display, the viewing surface of the curved display device may be bounded by a plane 40 and a cylinder 42 tangential to the center of the viewing surface, wherein the bounding cylinder 42 has a radius of curvature R3 greater than the typical viewing distance R1 to the center of the display. A variety of curve segments may be used in this bounded space, such as circular, elliptical, parabolic, and hyperbolic cosine curves, as well as piecewise combinations of such. The bounding range allows a variety of curvature profiles while maintaining a curvature wherein the length of a line segment from the viewer's eyes to the display edges is larger than the line segment from the viewer's eyes to the center of the display; providing a typical viewing distance R1 to the center that is smaller than the viewing distance R2 to the edges.

Since any number of curve shapes can be selected, it is important to select a metric that can adequately describe the overall degree of curvature, independent of the actual shape of the curve. Note that the radius of curvature of the display surface which was applied in the prior art to describe the shapes of the desired curve, decreases as the display is deformed from a flat surface to a circular-shaped surface, along which each horizontal point has an equal viewing distance. The use of radius of curvature as a metric only pertains to display surfaces wherein one edge of the display is positioned along a circle as the radius of curvature varies at each point along other curve shapes, such as a parabola. Therefore, it is important to define a more relevant metric. The authors have found that the metric of end deflection D not only performs well in this respect but the preferred values of end deflection are linearly related to the surface width W of the display surface.

It might also be noted that for a spherical surface, either end deflection or the radius of curvature may be used to indicate the overall curvature of a display having a given width since for a spherical surface one of these values may be directly calculated from the other, which allows comparison of curved displays of the present invention with the prior art. To calculate the end deflection D, given a radius r of a spherical surface and the width W of the display surface, the following equation may be employed:

$$D = r - (r \cos(W/(2r)))$$

As described at http://mathworld.wolfram.com/CircularSegment.html.

The applicants have determined, however, that in many applications of a single user desktop display, an immersive experience is not desired. Users perceive the desktop display as one tool within the work environment. To construct the display to provide an immersive environment is to construct the display such that it reduces the user's awareness of other important information within the working environment, such as the appearance of a co-worker. Moreover, the conventional spherical surface, or portion of a spherical surface, having a constant viewing distance provides an unrealistic and unnatural interaction experience with information displayed on the surface and is therefore not preferred. For example, in a typical working environment, a user expects that documents, such as a graphical rendering of a page of text, appear relatively flat as they would typically appear when the user is reading a page in a notebook. However, when the desktop display is curved to a cylindrical shape across its horizontal dimension having a radius of curvature consistent with a typical desktop display viewing distance or other radii of curvature as shown in the prior art, the page of text will appear substantially curved and is therefore less comfortable to read.

It should also be noted that when discussing curved displays, the prior art provides for a desktop display device that will fill a large portion of the user's field of view. In fact, the one true curved desktop display device that has been discussed in the prior art has a horizontal width of 114 cm (45 inches) and since large differences between the viewing distance to the center and the viewing distance to the edge of a display do not become significant until the horizontal width of the display is very large, one might not expect the benefit of display curvature to be significant for displays having a viewing surface with a smaller width. For this reason, it was not anticipated that a curved display would be preferred when the horizontal width of the display device was significantly less than 110 cm and it was certainly not anticipated that a curved display would be preferred over a flat display for display surfaces that were less than 90 cm.

However, the research conducted by the applicants has also clearly demonstrated that curved display surfaces can be useful for desktop displays having a horizontal dimension as small as 48 cm. However, the participants within these studies indicated that end deflections of less than 1 cm might not provide enough benefit to be worth additional expenditure while they clearly saw the advantage of end deflections even beyond 15 cm for the displays at the upper bound of this range. Further, the vast majority of participants preferred curved displays having a display surface that was between 60 and 100 cm in width for use in desktop environments.

To collect the supporting data, prototype desktop displays were fabricated on a flexible substrate. These displays presented the users with information that is consistent with typical desktop office environments. These display devices had a resolution of 40 pixels per cm, a display height of about 30 cm and varied in their width from 48 to 132 cm. These displays were mounted in one of two supports. A first support allowed the center and ends of the display to be moved separate from one another, allowing the display to be formed into parabolic curves with different end deflection values. The second support allowed the display to be positioned at these two sets of points, as well as an intermediate point that allowed the display to take on hyperbolic and circular curves. A group of 21 individuals completed experimental sessions in which they sat at a desktop with a keyboard, were asked to position the display to their preferred end deflection, and then were shown the displays mounted in the first fixture. During the experimental session, the experimenter adjusted the end deflection of the substrates until the preferred end deflection was achieved. This value as well as the viewing distance was recorded. The resulting values were analyzed to acquire average and standard deviations for the preferred end deflection as a function of display width. During another set of experimental sessions 9 individuals were shown the 91 and 132 cm substrates when curved to parabolic, circular and hyperbolic shapes. Preference for display shape was again recorded. This group of participants were also used to confirm the earlier preferred end deflection values.

The following table shows the average preferred end deflection values as a function of display width. Also shown is the average viewing distance for the users. Notice that the viewing distance is on the order of 60 to 70 cm for all experimental conditions. These viewing distances are relatively consistent with the viewing distances that would be expected based upon the relevant ergonomic standards for desktop displays.

| Width (cm) | Average End Deflection (cm) | Standard Deviation of End Deflection (cm) | Average Viewing Distance (cm) |
|---|---|---|---|
| 48.3 | 1.7 | 1.58 | 62.4 |
| 55.9 | 3.0 | 0.60 | 62.4 |
| 63.5 | 4.9 | 1.40 | 62.4 |
| 71.1 | 7.1 | 1.61 | 68.7 |
| 91.4 | 9.9 | 2.53 | 69.5 |
| 111.8 | 14.1 | 3.73 | 69.5 |
| 132.1 | 20.5 | 5.02 | 70.0 |

Figure 4A:
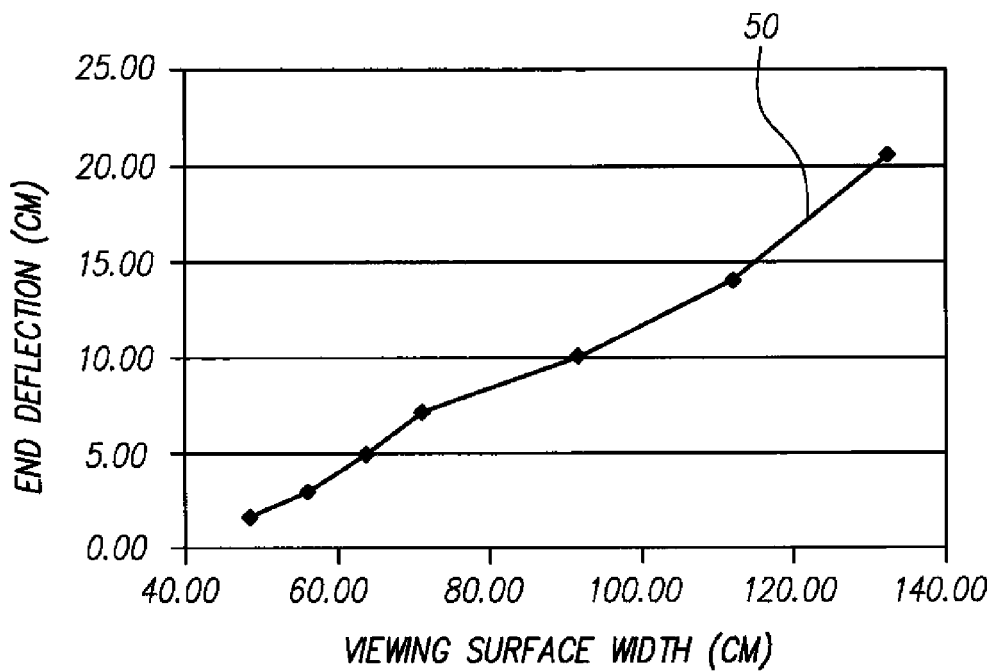
FIGS. 4a and 4b are graphs illustrating the results of experiments to determine user preferences.

The individual data points in FIG. 4a also indicate data collected by the applicants relating average preferred end deflection to the width of the viewing surface. Also shown in FIG. 4a is a line 50, demonstrating the linear relationship that was found to relate the viewing surface width (W) to the average preferred end deflection values. Note that this linear relationship explains the variability in the data quite well and takes the form that the average preferred end deflection value D can be computed (based on least squares linear regression) from:

$$D=0.215W-8.9.$$

As such equation represents experimentally observed end deflection values for desktop display devices, in a particularly preferred embodiment, the present invention is directed towards curved displays wherein D is within plus or minus 10% of (0.215 W−8.9).

Figure 4B:
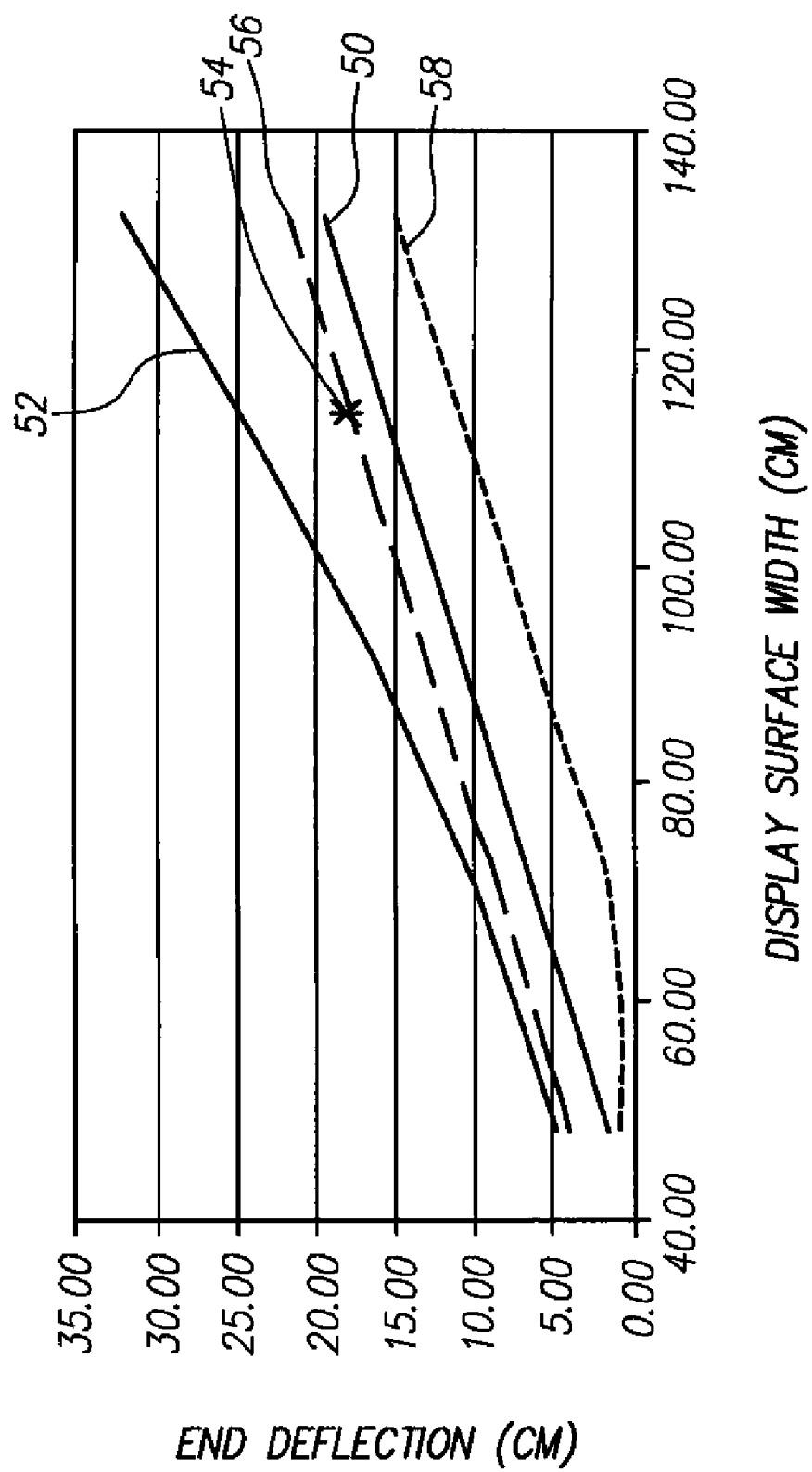

Curve 50 is also reproduced in FIG. 4b. For comparison, also shown in FIG. 4b is a curve 52 relating end deflection to viewing surface width for a spherical surface with a radius of curvature of 61 cm (24 inches), which corresponds to a desktop viewing distance that is just slightly larger than the "optimal" viewing distance according to ergonomics standards. The prior art would accordingly suggest larger end deflection values than the linear relationship 50 relating viewing surface width to preferred end deflection values that were determined by the applicants. As can be seen and as claimed in the present invention, users prefer displays having an increasing end deflection with increased display width. However, this relationship is linear rather than nonlinear as would be assumed based on the prior art curve 52, and at smaller end deflection values for a given display width than would be assumed based on the prior art. Also shown in FIG. 4b is a point 54 indicating the dimensions of the example display discussed in U.S. Pat. No. 6,813,074. As shown, the end deflection value for this example display is also larger than the average preferred end deflection values obtained in the experiments conducted by the applicants.

To obtain a statistically significant boundary for a range of preferred end deflection values in accordance with the experimental findings of the present invention, the linear function 50 relating average preferred end deflection to the display surface width W was adjusted by the offset of the average of the standard deviation values obtained from this experiment. By subtracting the average of the standard deviations of the end deflection values (i.e., 2.4 cm) from the offset of the linear function 50, an adjusted linear equation can be obtained. Applying the resulting equation, a display of the present invention having a value equal to the regressed average deflection value such plus 1 average standard deviation will have an end deflection value D that is less than or equal to:

$$D=0.215W-6.5.$$

The resulting equation is depicted as line 56 in FIG. 4b. The end deflection value of 18.2 cm for the 114 cm display discussed in U.S. Pat. No. 6,813,074 is also larger than the value of 18.03 cm, which is obtained from the plus 1 standard deviation formula at 114 cm. Therefore, in accordance with the present invention, assuming that the preferred end deflection values are normally distributed, more than 83 percent of users would be expected to prefer an end deflection value smaller than mentioned in the example provided in U.S. Pat. No. 6,813,074.

While end deflections of less than 1 cm may not provide significant improvements for desktop displays regardless of display width, to provide at least a preferred minimum amount of curvature relative to a flat display in order to improve perception of images at the edges of the display, a preferred range of deflection values can further be defined by bounding the lower portion of this range by the average values minus two times the average standard deviation. Therefore, a yet more preferred display of the present invention will have an end deflection value D that is also greater than or equal to:

$$D=0.215W-14.5$$

This linear equation can be used to compute the line 58 shown in FIG. 4b for displays widths of about 72 cm or greater, with the line 58 also depicting the preferred minimum of 1 cm for all display widths W less than about 72 cm. Notice that two standard deviations were selected to form the lower boundaries, since the users were generally more accepting of displays having smaller end deflection values as compared to larger end deflection values.

In one embodiment of the present invention, the viewing surface of the display may be curved only in the horizontal direction. In such embodiment, the viewing surface is flat in the vertical direction, with zero curvature and an infinite radius of curvature. In an alternative embodiment, the vertical radius of curvature may be nonzero so that the viewing surface curves towards the viewer in the vertical direction as well as in the horizontal direction. Further, the vertical radius of curvature may be constant or it may change between top and bottom of the display surface. In another application of the present invention, the viewing surface of the wide-format display may not be perfectly vertical, for example, to accommodate the viewing requirements of a user seated at a desk. In this embodiment, the viewing surface may be tilted, e.g. upward from 5 to 25 degrees, preferably close to 15 degrees.

Applicants have determined through experimentation that the conventional spherical viewing surface typically employed by immersive systems is unsuitable for computer-interactive applications employing typical computer and office workstation use, for example editing document such as text, spreadsheets, or presentation files or for more computer intensive tasks such as programming. In these applications, an immersive environment is distracting and may lead to motion sickness, and lines and rectilinear graphics may appear to unnaturally converge. Moreover, users do not readily interact with detailed information presented at the periphery of a user's vision. At the same time, tests have shown that users do not prefer a completely flat surface for interacting with wide-format screens since the viewing distance to the display's edges becomes uncomfortably long. Additionally, a typical user interface does not provide an appropriate perspective view of objects in a graphic user interface. Nor are adjacent, flat displays forming a polygonal surface preferred, as these provide a discontinuous viewing surface. According to tests performed by applicants, users prefer wide-format viewing surfaces having an aspect ratio greater than 1.8:1 and a continuous, concave viewing surface whose viewing distance to the center is smaller than the viewing distance to the edges. The sides are typically the vertical edges of a curved rectangular surface and the top and bottom are the horizontal edges at the top and bottom of the viewing screen. Such an arrangement provides a combination of preferred perspective and preferred ergonomics with no psychophysical immersion problems.

Additionally, it is noted by the applicants that having a display with a large vertical dimension is not generally desirable within many desktop applications as the user can experience neck and eye strain when viewing the top of a display having a large vertical dimension. A display of the present invention will therefore, preferably have a vertical dimension such that the display surface height H is no more than 50 cm and more preferably of no more than 35 cm in height. In general, it is preferred that the display is horizontally symmetric about the center of the display.

The present invention is preferably an active-matrix flat panel display having a plurality of pixels that is capable of providing a high resolution, for example VGA or greater. Curved liquid crystal and organic light emitting diode displays have been discussed in the art and can be employed as the wide-format display of the present invention, for example as referenced in published application US2004/0135160. Projection displays may also be employed. Tiled displays are also known in the art and can be used, for example as referenced in published application US2004/0008155 and U.S. Pat. No. 6,559,910, and co-pending, commonly assigned U.S. Ser. Nos. 10/785,624, 10/815,012 and 10/815,013, the disclosures of which are incorporated herein by reference, and may be used in combinations with or without individual curved surfaces. In any curved configuration according to the present invention in which the source pixel elements are planar (for example with typical projection displays), the pixels in the displays must be corrected to form a smooth appearance to the overall displays. Such techniques are described in the art.

It should also be noted that truly curved, display surfaces that are apparently formed from a single display module, such as shown within this application have distinct advantages over displays that are formed from multiple display modules, which are also shown in this and the previously discussed disclosures, since they are less likely to suffer with issues such as misalignment, apparent gaps between information regions or changes in luminance or color between display modules. Therefore a display formed from a single display module has significant advantages over a display formed from multiple modules since displays formed from multiple modules are more likely to have these artifacts and these artifacts can significantly detract from the user's productivity and satisfaction.

In a preferred embodiment, the invention is employed in a device that includes Organic Light Emitting Diodes (OLEDs) which are composed of small molecule or polymeric OLEDs as disclosed in but not limited to U.S. Pat No. 4,769,292, issued Sep. 6, 1988 to Tang et al., and U.S. Pat. No. 5,061,569, issued Oct. 29, 1991 to VanSlyke et al. Many combinations and variations of organic light emitting displays can be used to fabricate such a device.

The present invention may be applied to a wide variety of tasks with a range of preferred viewing distances and display resolutions. Since the viewing distance and the required resolution of a display are closely related such that viewing distance generally decreases for displays having higher resolution, in yet another embodiment of the present invention, the range of end deflections of the viewing surface of the wide-format display device may further be optimized based on the resolution of the display.

The invention has been described in detail with particular reference to certain preferred embodiments thereof, but it will be understood that variations and modifications can be effected within the spirit and scope of the invention.

PARTS LIST

| | |
|---|---|
| 10 | curved display |
| 11 | viewing surface |
| 12 | center |
| 14 | edge |
| 16 | user |
| 20 | computer |
| 22 | surface |
| 24 | keyboard |
| 26 | pointing device |
| 28 | support |
| 30 | connection |
| 40 | plane |
| 42 | bounding cylinder |
| 50 | line indicating average preferred end deflection values |
| 52 | comparison curve |
| 54 | point in example from prior art |
| 56 | plus one standard deviation line |
| 58 | minus two standard deviation line |
| D | end deflection distance |
| H | display surface height |
| W | display surface width |
| L | line segment |
| R1 | center viewing distance |
| R2 | edge viewing distance |
| R3 | bounding cylinder radius of curvature |

What is claimed is:

1. A curved desktop display device comprising a continuous, curved, concave, non-immersive viewing surface having a horizontal radius of curvature that varies from the center of the viewing surface to the display edges in the width dimension, and having a surface width W greater than or equal to 48 cm and less than or equal to 200 cm, and wherein a distance D from the center of a straight line segment which connects the centers of the display edges in the width dimension, to the center of the display surface in the horizontal dimension is less than or equal to $((0.215\ W) - 6.5\ cm)$; and wherein the display device is an OLED display.

2. The curved desktop display device of claim 1, wherein D is within 10 percent of $((0.215\ W) - 8.9\ cm)$.

3. The curved desktop display device of claim 1, wherein D is equal to or greater than 1 cm.

4. The curved desktop display device of claim 3, wherein D is greater than 0 and equal to or greater than $((0.215\ W) - 14.5\ cm)$.

5. The curved desktop display device of claim 1, wherein the horizontal radius of curvature of the continuous curved concave non-immersive viewing surface decreases from the center of the viewing surface to the display edges in the width dimension.

6. The curved desktop display device of claim 1, wherein the horizontal radius of curvature of the continuous curved concave non-immersive viewing surface has a first or second derivative with respect to distance from the display center that varies monotonically.

7. The curved desktop display device of claim 1, wherein the display is horizontally symmetric about the center of the display.

8. The curved desktop display device of claim 1, wherein the ratio of the horizontal width of the display surface to the height of the display surface is greater than 1.8.

9. The curved desktop display device of claim 1, wherein the radius of curvature is constant over a portion of the surface.

10. The curved desktop display device of claim 1, wherein the viewing surface has a constant vertical radius of curvature.

11. The curved desktop display device of claim 1, wherein the viewing surface has no curvature in the vertical direction.

12. The curved desktop display device of claim 1, wherein W is from 60 to 100 cm.

13. The curved desktop display device of claim 1, wherein the display device is a tiled display.

14. The curved desktop display device of claim 1, wherein the display device is an active-matrix display.

15. The curved desktop display device of claim 1, further comprising pixel elements on the concave side of the curved display surface.

* * * * *